H. M. HAYWARD.
AUTOMATIC EGG BOILER AND POACHER.
APPLICATION FILED SEPT. 14, 1920.
1,410,754.
Patented Mar. 28, 1922.
2 SHEETS—SHEET 2.
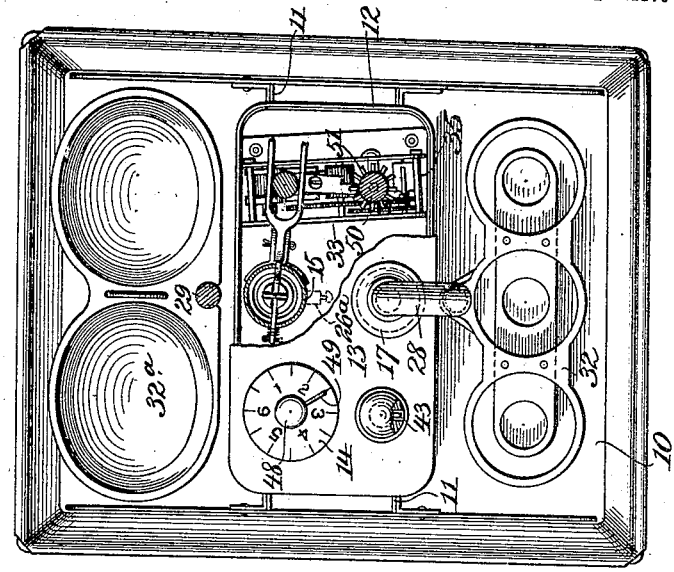
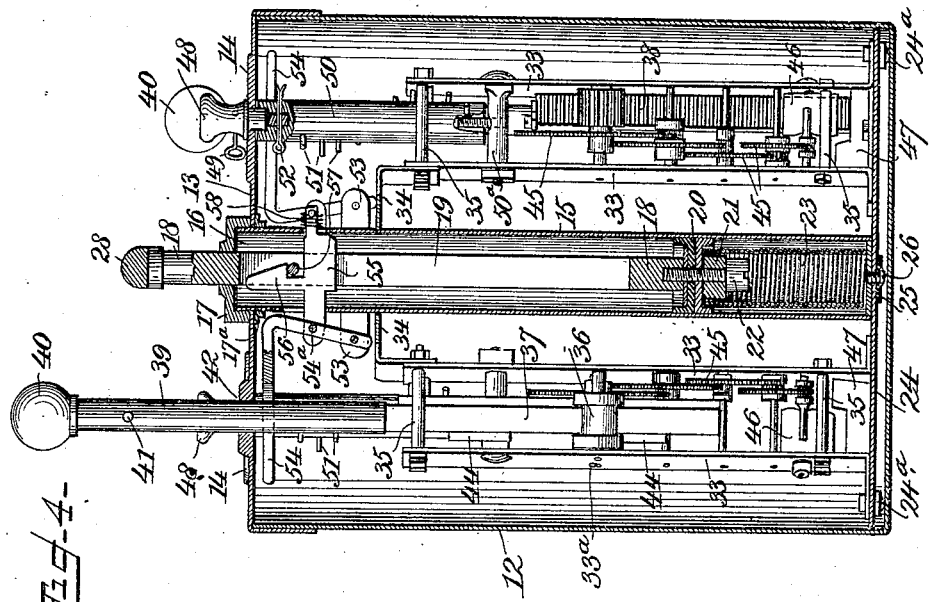
H. M. Hayward
INVENTOR
WITNESSES
Charles H. Durand
Philip E. Siggers
BY
E. G. Siggers
ATTORNEY

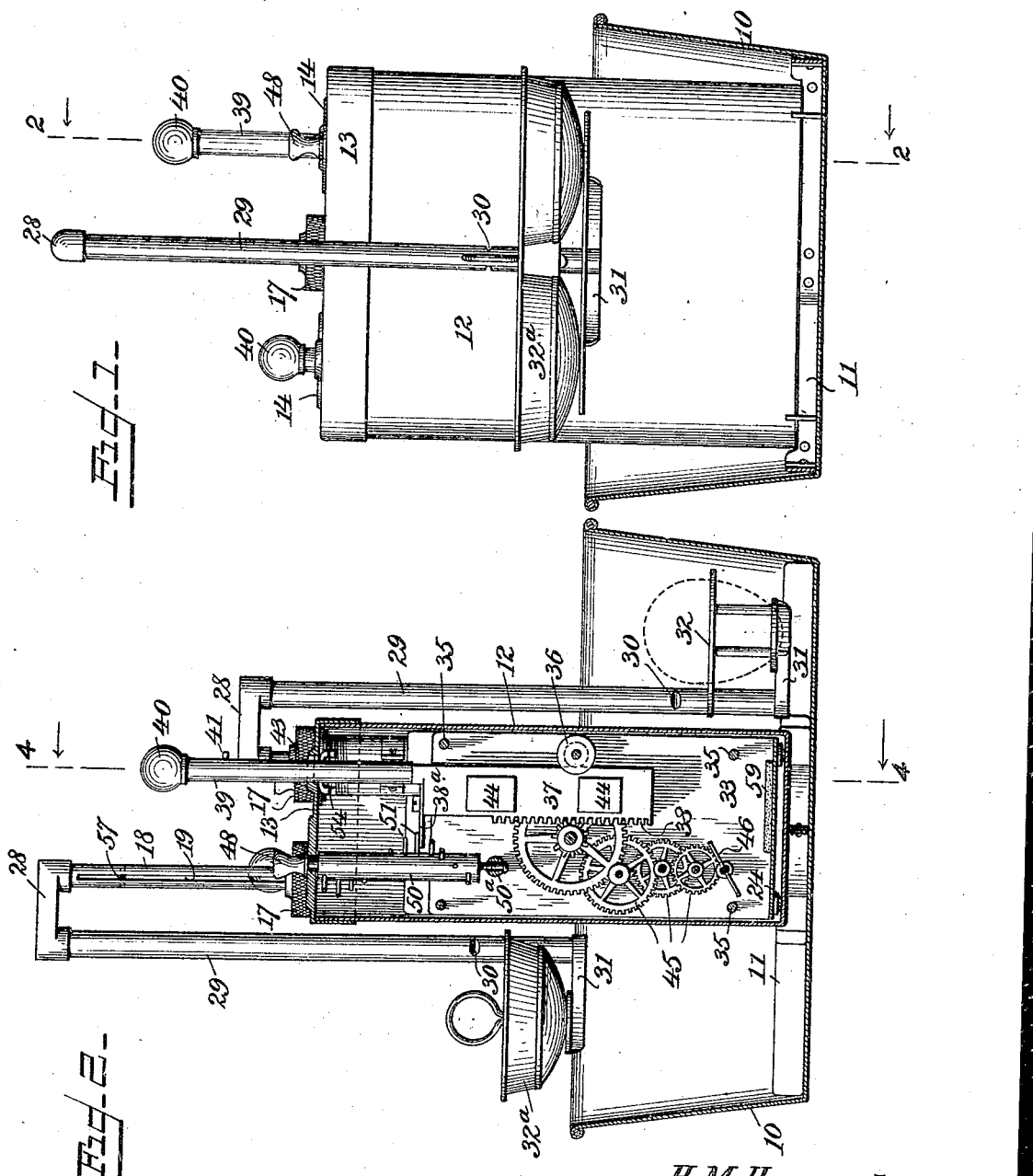

UNITED STATES PATENT OFFICE.

HARLEY MARTIN HAYWARD, OF CHATTANOOGA, TENNESSEE.

AUTOMATIC EGG BOILER AND POACHER.

1,410,754.  Specification of Letters Patent.  Patented Mar. 28, 1922.

Application filed September 14, 1920. Serial No. 410,137.

*To all whom it may concern:*

Be it known that I, HARLEY M. HAYWARD, a citizen of the United States, residing at Chattanooga, in the county of Hamilton and State of Tennessee, have invented a new and useful Automatic Egg Boiler and Poacher, of which the following is a specification.

This invention relates to automatic egg boilers and poachers.

The general object of the invention is to provide a device of this character which is entirely automatic in its action so that the cook, after starting the mechanism, may give his attention to other duties, with the assurance that cooking of the eggs will cease at the expiration of the desired time interval.

The invention has other objects which will appear as the description is proceeded with.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 1 is an elevation of the automatic egg cooker shown supported within a pan, the latter being indicated in cross-section.

Fig. 2 is a section on the line 2—2 of Fig 1.

Fig. 3 is a top plan view of the parts shown in Fig. 1, with the top of the casing shown broken away.

Fig. 4 is a cross section on the line 4—4 of Fig. 2.

The reference numeral 10 denotes a pan which should be of a size and shape to receive the automatic egg cooker, but whose construction is immaterial to the present invention. A rack 11 is provided to fit within the pan and rest on the bottom thereof so that the automatic cooker may be supported in the proper position within the pan. The pan 10 is adapted to hold boiling water and to be placed over a stove so that the eggs supported by the automatic cooker may be lowered into the water in the pan and then automatically be raised at the expiration of a given time interval. Instead of using a pan and rack, a cooking utensil may be employed, through which steam coils or the like pass, or which has electrical heating coils for the water.

The automatic egg cooker which forms the subject of the present invention includes a casing 12 having a cover 13, means outside the casing for supporting the eggs, and means within the casing for lifting the egg supports automatically. The upper face of the cover 13 has a pair of dials 14 for a purpose to be made plain later.

A cylinder 15 is enclosed within the casing 12 and extends the entire height thereof. The upper end 16 of the cylinder 15 is screw threaded as seen in Fig. 4, and a cap 17 is screwed upon said end on the outside of the cover. A collar 17$^a$ is provided on the cylinder 15 and on the under side of the cover 13. When the cap 17 is screwed down, the cylinder and cover are united to one another so that when the cover is removed from the casing, the cylinder and all connected parts are also removed.

There are two of the cylinders 15 and in fact, there are two complete independent time-controlled mechanisms for raising the eggs out of the water. Since these mechanisms are duplicates of each other, a description of one will suffice for both. The cap 17 has a central aperture to receive a rod 18. This rod extends for the greater part of the length of the cylinder and has a relatively narrow slot 19 extending for the main part of its length. The lower end of the rod 18 is connected to a piston or plunger 20 by screw 22 and nut 21. The plunger 20 has an air-tight fit with the walls of the cylinder 15 so as to have an action similar to the plunger of an ordinary air pump. Below the plunger a strong coil spring 23 is housed, such spring bearing at its upper end directly against the plunger and at its lower end upon the bottom of the cylinder 15.

The tendency of the spring 23 is to force the plunger upwardly in the cylinder. The latch 55 has a catch arm 56 engageable with a pin 57 provided in the slot 19. This latch prevents the plunger from rising in the cylinder until it has been released from the pin. The lower end of the cylinder is screw threaded to receive a screw 26, and a washer 25 is held by the screw 26 on the under side of a base frame 24. The washer closes the bottom end of the cylinder. The cylinder has a needle valve 26ª which is adjustable by screw threads so as to control the rate of flow of air into the cylinder when the plunger rises under the action of the coil spring.

The base frame 24 is held spaced from the bottom of the casing 12 by any desirable form of legs 24ª. Upon the upper side of the base 24, frame members 33 are secured, two of these frame members 33 being joined together by bolts 35 to constitute a frame. These are two of these frames each joined at its upper end to the cylinder by a bracket 34. The cylinder is, however, removable from the bracket.

The upright frames formed by the joined frame members 33 each support a roller 36 at an intermediate point, said rollers being provided for a rack 37 having teeth 38. The rack 37 is designed to move in a vertical path and drive in the course of its descent a train of gears denoted in its entirety by the numeral 45. The rack 37 should have sufficient weight to drive these gears at the required speed and may be provided with weights 44 on one or both side faces. The frame 33 has an oblong slot 33ª on each side into which the ends of the first gear, which works with the rack, fits. When the rack is lifted the first gear is lifted out of gear with the second and succeeding gears, thereby permitting it to turn with freedom and immediately mesh with it when released.

The train of gears 45 drives a fan 46. A shield 47 may be provided to slow down somewhat the revolution of the fan. The speed ratio of the train of gears is such that the weight rack descends very slowly, consuming six minutes or more in its descent. The length of time which will elapse before the rack ceases to drive the train of gears will obviously depend upon the height to which the rack is raised. Means is provided for controlling this height in the form of a barrel 50 having a series of projecting pins 51 extending radially therefrom and arranged spirally. The upper end of the barrel 50, which has a cylindrical form, passes through the cover 13 centrally of the dial 14 and has a knob 48 provided with a pointer 49. In the drawing, the dial 14 is illustrated as reading to six minutes in sub-divisions of one-half a minute. If the device is so constructed, there should be twelve pins 51, each pin being arranged at a different height, the difference in height between each pin representing the distance the rack 37 will travel in one-half a minute. The lower end of the barrel 50 is pivotally supported as indicated at 50ª between the frame members 33, so that it may turn on its longitudinal axis. The upper end of the rack 37 has a stop arm 38ª of sufficient length to engage with one of the pins 51, the particular pin depending upon the position of the pointer 49 on the dial 14.

The rack 37 is joined at its upper end to a rod 39 which passes in a hole 42 provided in the cover 13. The rod 39 has a finger 41 projecting therefrom and the cover has a slot 43 of the proper dimensions to permit the said finger to pass through the cover upon the descent of the rack. A latch-actuating arm 54, preferably bifurcated at one end, is disposed with its furcations surrounding the rod 39 and is pivotally connected with the latch member 55, as indicated at 54ª. Ears 53 provide a pivotal support for the end of the latch-actuating arm 54. When the pin 41 passes through the slot 43, the uppermost tooth on the rack is engaged with the train of gears 45. When the rack bar moves from the position of engagement, it falls to the bottom 24 of the frame. This fall of the rack brings the finger 41 into engagement with the arm 54, whereupon rocking of said arm is effected, causing rocking of the latch member 55 out of engagement with the pin 57. The latch member 55 has its ends received in slots running longitudinally of the cylinder 15 and a spring 58 surrounds that end of the latch member 55 remote from the pivotal connection 54ª. The action of the spring 58 will be to hold the catch piece 56 normally in engagement with the pin 57. The rod 39 has a convenient form of handle 40 at its upper end, whereby it may be lifted readily until the stop 38ª is brought in contact with one of the pins 51. The upper end of the barrel 50 is held securely to the knob 48 by means of a cotter pin 52, thus allowing the barrel 50 and pointer 49 to be moved in unison about the dial 14. A pad 59 is preferably furnished upon the base 24 in line with the path of movement of the rack 37 so as to deaden the fall of the rack after it is released from the train of gears.

The upper end of each rod 18 is joined to an arm 28 which in turn is connected with a rod 29 extending in parallelism with the rod 18. The rod 29 has a pair of grooves 30 near its lower end, and at its extremity carries a frame 31. This frame, as seen in Fig. 3, has a plurality of apertures therein adapted to receive and seat the small ends of eggs, as indicated in dotted lines in Fig. 2. An auxiliary frame 32 holds the eggs in place for boiling. The auxiliary frame 32 is properly shaped for connection with the rod 29 by being slid in the grooves 30 and then moved downwardly along the rod. In case the eggs are to be poached instead of boiled, a poaching frame 32ª is provided whose connection with the rod 29 is the same as the connection of the frame 32 with the said rod. The poaching vessel 32ª merely rests upon the frame 31, while the boiling frame 32 has legs fitting into sockets provided on the frame 31.

While the drawing illustrates a single casing having two mechanisms therein, it will be clear that the invention is capable of use where an entire battery of the mechanisms is employed. Such a construction will be especially useful in hotels, where the chefs are ordinarily too busy to keep track of the time of the cooking of each egg. By the use of the present invention, one may set the mechanism for any desired interval of time and go about other duties with the assurance that at the expiration of the time interval, the eggs will be automatically raised out of the water, thus stopping the cooking, while keeping them warm until lifted from the cooker.

When desired, the poaching frame can rest on top of the boiling frame, so as to be supported at the surface of the water instead of beneath the same. The poacher can be used alone to hold eggs while being boiled.

What is claimed is:—

1. In an automatic egg cooker, a casing, a time controlled mechanism in the casing, an egg holding frame, means for effecting lifting of the frame, a latch for holding said means inoperative, said mechanism tripping said latch, and means for setting the mechanism to regulate the time interval during which the mechanism operates before the latch is tripped, said setting means including a spirally arranged means adapted to limit movement of the operating mechanism of the time-controlled mechanism.

2. In an automatic egg cooker, a casing, a time controlled mechanism in the casing, a gravity-operated rack for actuating said mechanism, an egg holding frame, means for lifting the frame, a latch for holding said means inoperative, said rack tripping said latch, and staggered means cooperating with the rack for setting the mechanism to regulate the time interval during which the mechanism operates before the latch is tripped.

3. In an automatic egg cooker, a casing, a frame fitting within the casing, a top for the casing, a time controlled mechanism in the frame, means for holding eggs, automatic means for raising the egg holder, a latch for rendering the raising means normally inoperative, the time controlled mechanism tripping the latch, and the casing top, frame, timing mechanism and raising means all being united to form a unit capable of being let down into the casing and there closed in.

4. In an automatic egg cooker, means for holding eggs, and means for lifting the egg holding means comprising a cylinder, a piston therein, a coil spring below the piston for causing the piston to rise in the cylinder, a valve near the bottom of the cylinder for admitting air thereinto, during movement of the piston, said valve comprising means whereby the speed of lifting may be controlled so that the eggs may be lifted out of the water without splashing.

5. In an automatic egg cooker, means for holding eggs, and means for lifting the egg holding means comprising a cylinder, a rod movable therein and secured to the egg holding means, a slot in the rod, a latch received within the cylinder and movable in the slot, a catch in the slot for the latch, a piston secured to the lower end of the rod, and a spring for causing the piston to rise, the latch preventing said rising when engaged with the catch.

6. In an automatic egg cooker, means for holding eggs, means for lifting the egg holding means comprising a cylinder, a rod movable therein and secured to the egg holding means, a latch received within the cylinder, a catch in the cylinder for the latch, a piston secured to the lower end of the rod, a spring for causing the piston to rise, the latch preventing said rising when engaged with the catch, and a valve for admitting air into the cylinder during movement of the piston, said valve comprising means whereby the rising speed of the piston may be controlled.

7. In an automatic egg cooker, a casing, a rod movable vertically outside the casing, time controlled means within the casing for automatically raising said rod at the expiration of a given time interval, and an egg cooking frame detachably secured to the rod, said rod having a groove for admitting a part of said frame thereon to slide on the rod and be locked against transverse movement with respect to the rod.

8. In an automatic egg cooker, a time controlled mechanism including a rack, a train of gears driven by the weight of the rack, and means spirally arranged and adapted to selectively regulate the height through which the rack may be elevated.

9. In an automatic egg cooker, a time controlled mechanism including a slidable rack, a train of gears driven by the weight of the rack, means spirally arranged, and means connected with the rack and adapted to selectively engage portions of the spirally arranged means for limiting upward movement of the rack.

10. In an automatic egg cooker, an egg holder, a time controlled mechanism including a rack for driving the mechanism by gravity, an arm on the upper end of the rack, a dial having a time scale, a barrel rotatable on its axis and having a pointer extending over the face of the dial, said barrel also having a plurality of like pins projecting therefrom radially and arranged spirally, the distance between adjacent pins equalling the distance the rack moves in the smallest time interval represented on the scale, the arm on the rack being engageable with one of the pins to prevent the rack from being raised beyond the desired position.

11. In an automatic egg cooker, an egg holder, a time controlled mechanism including a rack for driving the mechanism by gravity, an arm on the upper end of the rack, a dial having a time scale, a barrel rotatable on its axis and having a pointer extending over the face of the dial, said barrel also having a plurality of like pins projecting therefrom radially and arranged spirally, the distance between adjacent pins equaling the distance the rack moves in the smallest time interval represented on the scale, the arm on the rack being engageable with one of the pins to prevent the rack from being raised beyond the desired position, a train of gears driven by the weight of the rack, and a fan rotated by the train of gears.

12. In an automatic egg cooker, means for holding eggs, means for raising the egg holding means, a latch for the raising means, a time controlled mechanism including a gravity-operated rack, a train of gears rotated by the rack, the teeth of the rack extending for only a part of its length whereby the rack after descending to a certain point gets out of mesh with the train of gears and falls, stop means for the rack after it has fallen the desired distance, and a pin or projection on the rack spaced from the toothed portion thereof and adapted to engage with the latch upon the fall of the rack to release the raising means.

13. In an automatic egg cooker, a casing, a time-controlled mechanism in the casing, an egg holding frame, a cylinder, a piston operating in said cylinder and secured to said egg-holding frame, means for holding said piston depressed in said cylinder against an elevating force, said time-controlled mechanism being adapted to trip the holding means and release the elevating force to raise the frame, and spirally arranged means for regulating the period of operation of the time controlled mechanism.

14. In an automatic egg cooker, an egg holder, a time-controlled mechanism including a rack for driving the mechanism by gravity, an arm on the upper end of the rack, a dial having a time scale, a barrel rotatable on its axis and having a pointer extending over the face of the dial, said barrel having a plurality of lock pins projecting therefrom, the distance between adjacent pins equaling the distance the rack moves in the smallest time interval represented on the scale, the arm on the rack engaging a pin on the barrel to predetermine the desired distance through which the rack must travel, and means releasable by the rack for releasing the egg holder.

In testimony that I claim the foregoing as my own, I have hereto affixed my signature.

HARLEY MARTIN HAYWARD.